May 8, 1956 M. F. SPEARS 2,744,981
MEANS FOR CONTROLLING CURRENT FLOW IN ELECTRIC CIRCUITS
Filed June 16, 1953
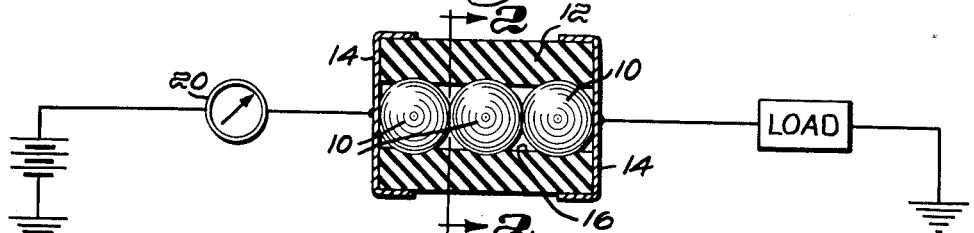
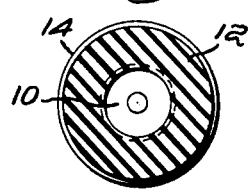
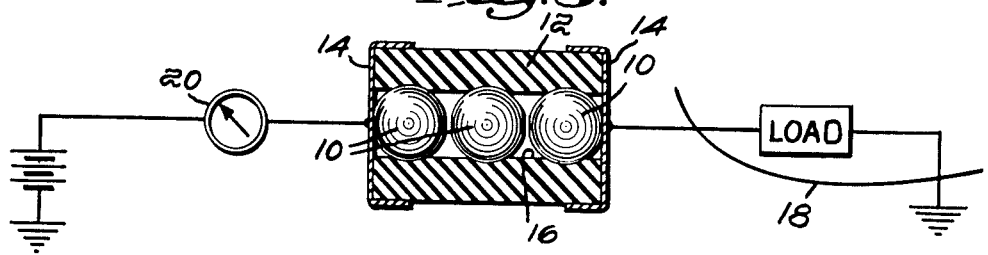
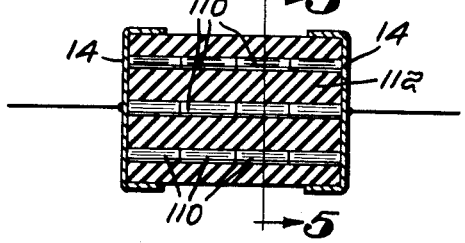
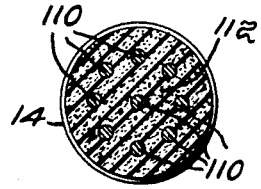
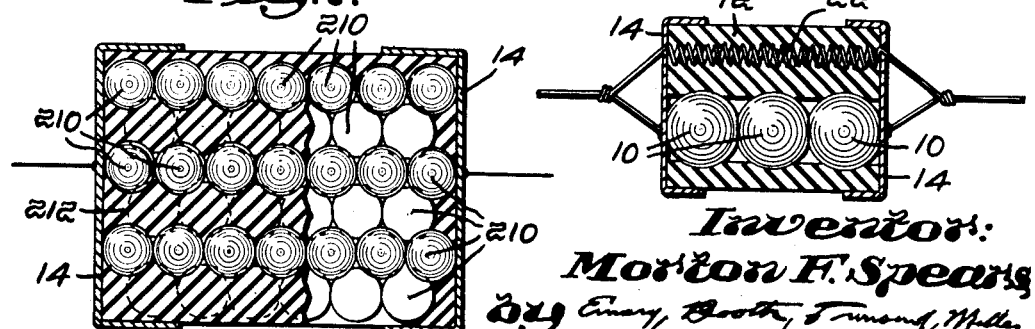
Inventor:
Morton F. Spears United States Patent Office 2,744,981
Patented May 8, 1956

2,744,981

MEANS FOR CONTROLLING CURRENT FLOW IN ELECTRIC CIRCUITS

Morton F. Spears, Westwood, Mass.

Application June 16, 1953, Serial No. 361,921

14 Claims. (Cl. 200—113)

This invention relates to a means for controlling the flow of current in an electric circuit as for example by breaking the circuit when such flow becomes excessive in amount. While in practice embodiments of the invention may be supplied as small unitary articles which may resemble in form, and which in a certain sense may subserve the function of, fuses of the clip-in type (and such units are herein illustrated), from another point of view the invention provides a material of construction from which such or similar units may be formed. Such a material might be considered a composition of matter embodying two components which have differentiated properties of electrical conductivity and of thermal expansion. These components are not mechanically connected as are the elements of a machine although they form a "mechanical mixture." As in any such mixture the properties of the mixture are determined not only by the physical properties of the components (conductivity and expansibility) but also by the physical form of the components and their relative physical positions of juxtaposition in the composition.

The object of the invention is to provide such a material which may be inexpensively produced in forms having different electrical values to suit various uses and which may be easily and simply utilized in compact units for different applications. A coordinate object is to provide such a material which will function accurately and repeatedly under the conditions of use. It will have no moving parts as those words are usually understood and may be utilized in remote or otherwise inaccessible locations since direct access thereto will not be required to replace or to reset it after it has once functioned.

The invention will be well understood by reference to the following description taken in connection with the somewhat schematic representations of several embodiments thereof shown by way of example in the accompanying drawings, wherein:

Fig. 1 is a wiring diagram including a somewhat conventionalized longitudinal cross sectional view on an enlarged scale of a device exemplifying the subject matter of the invention and functioning in the manner of a circuit breaker;

Fig. 2 is a section on the line 2—2 of Fig. 1;

Fig. 3 is a view similar to Fig. 1 showing the operation of the circuit breaker under abnormal conditions;

Fig. 4 is a cross sectional view of a modified form of the device applicable for the same purposes as in Fig. 1;

Fig. 5 is a section on line 5—5 of Fig. 4;

Fig. 6 is a longitudinal cross sectional view of a further modification; and

Fig. 7 is a conventionalized longitudinal cross sectional view of another modification on a still larger scale, one more particularly adapted for use with heavy currents. In this figure the insulation is omitted at the right to disclose small masses wholly at the rear of the sectioning plane.

Referring to Figs. 1, 2 and 3, there is there shown in connection with the diagrammatic disclosure of elements of an electric circuit a controlling device illustrative of the invention shown with some realism, but nevertheless schematically. The device shown includes a row of three small contacting balls 10 of conductive material, say of invar alloy, tightly held in a sheath of insulating material 12, conveniently polymerized tetrafluorethylene, known under the commercial name "Teflon." The words "conductive" and "insulating" are used in their popular sense in the preceding sentence and are of course relative. Further details will appear. The balls 10 may desirably be slightly flattened, as shown, at the extremities of a diameter to provide an area rather than a point of contact between pairs, but it will be convenient to call them balls.

The row of balls is connected into the electric circuit at its terminal elements through end plates 14, the balls thus being in series connection, electrically considered. The construction as a whole may have the exterior appearance similar to that of the small fuses used on automobile circuits, and if suitably designed may be of comparable size and suitable for use in circuits of that character. I shall hereinafter refer to a group of balls or other small masses as a cluster, and when in a single row as in the modification now being discussed, they might be termed a linear cluster as distinguished from a "three-dimensional cluster," hereinafter to be described in connection with Fig. 7.

As seen in Fig. 1 the structure is one which might be formed by forcing the balls into a slightly smaller bore 16 in a rod-like body of the insulating material 14, and in these figures the wall of the bore is shown as somewhat deformed, so that the balls are tightly gripped. There should be at least a frictional engagement between the insulating material and the balls so that as the dimensions of the insulating material change, motion is transmitted to the balls, as will be described. In this instance the insulating material is exterior to the balls, that is, they are enclosed in an exterior sheath rather than threaded like beads on a string, and this structure is considered desirable as the insulating material may then in itself form the exterior exposed surface of the device.

The balls 10 are conductive, and when they are in contact, the cluster serves to pass the normal current for which the device is designed. They should, however, considered as a group have a resistance higher than an equal length of the conducting wires of the circuit, so that under an abnormal flow of current, local heating will occur. Heat so generated will be transmitted to the insulating material. This material, however, is so chosen that it has a greater coefficient of linear expansion than the balls. It expands and in so doing separates two or more of the balls one from another to break the series connection between them. This is shown schematically in Fig. 3, wherein the load on the circuit is shown as shorted by a wire 18. No substantial current now flows in the external circuit. At the left of Fig. 1 the needle of the meter 20 is shown deflected to the right, indicating a flow of current, whereas in Fig. 3 it has returned to the left-hand or zero position.

It will be understood that the mass and therefore the heat absorptive capacity of the insulating body 12 is so chosen as to secure the desired delicacy of response of the device as a whole.

The small masses of the conductive cluster in Figs. 2 and 3 are shown and have been described as balls, but the globular form is not necessary. In the modification of Fig. 4 I have shown a series of elongated elements 110 in the form of cylinders of small diameter set end to end. By way of simile we may compare them to the lead of an automatic pencil broken into short pieces. They may conveniently be constructed of carbon. As seen in Fig. 5 a number of these linear clusters of cylindrical masses may be disposed in geometrical and electrical parallelism in a body or matrix of insulating material 112 between the end plates 14. Passage of a greater quantity of current is provided for in this case. The operation is similar to that already described and it will be noted that if there is a break in one of the linear clusters the heating of the others is greater until the resistance has built up to such a degree that the flow of current in the external circuit is negligible in amount.

It is anticipated that in the manufacture of the modification of Fig. 4 the linear cluster of masses 110 might be initially a single wire-like strip of carbon and after they have been introduced into or covered with the insulating mass 112, they could be broken into a multiplicity of segments. A regular division into equal segments would not be obligatory.

In general in a construction such as described in connection with Figs. 1–3 and in Fig. 4 as so far described, when the current is interrupted the insulating material 12 will promptly cool, shrink, and return the parts to the positions shown in Figs. 1 and 4, whereupon if abnormal conditions still exist in the circuit heat will again be generated in the small masses, the insulating material will again expand, etc. If it is desired to keep the device open one may utilize semi-conductive material for the expansible carrier 112. For instance, in the case of tetrafluorethylene, it might be impregnated with carbon particles. This is indicated in Fig. 5 by stippling. In this case when the elements 110 have separated a small amount of current will flow through the semi-conductor 112. The resistance will be so great that the current in the external parts of the circuit is negligible, but sufficient heat will be generated to maintain the masses 110 separated. In this case the current will have to be turned off, as by opening the main switch of the circuit, and the structure cooled before it will resume the position of Fig. 4. When constructed in this manner the insulating material serves as a high resistance shunted around the conductive cluster and is normally short-circuited thereby.

In Fig. 6 I have shown a construction similar to that of Fig. 1 except that in the insulating material 12 a heating coil 22 is inserted, shunted around the cluster of balls 10. The action will then be the same as described in connection with Fig. 4. In the drawings, for purposes of clearness the diagrammatically illustrated resistance coil 22 is shown as organized completely at one side of the group of balls rather than coaxially therewith, although such a construction would not probably be utilized in practice.

In Fig. 7 I show a preferred embodiment of the invention capable of use in widely differing applications. Herein a relatively great number of small conductive masses 210 are arranged in what I term a three-dimensional cluster. The space relationship is like that which would be assumed by shot poured into a small glass. Shot of course would be approximately spherical, dried peas would be approximately, although not perfectly so, and dried pea beans would not be spherical at all, but the general structure would be similar in each case and of the type sometimes known as a three-dimensional array. The masses need not be identical in size but generally would be all within a limited range of sizes. These small masses would be in contact with each other and starting with one at one end we could trace various paths through the points of contact in all kinds of meanderings to the opposite end. Now, if such a cluster of conductive elements 210 is enclosed in a matrix 212 of insulating material, the result may be compared by way of metaphor with a conglomerate rock in which a number of pebbles are cemented together by an external matrix. It may be that not all the masses 210 will be in contact with the greatest possible number of adjacent masses, and a few of the masses might be completely isolated from adjacent ones by insulating material, but there will be a great number of points of contact and there will be a multitude of conductive paths from one end of the device to the other. We might say that in Fig. 1 there is a single linear path for the current, that in Fig. 4 there are several paths which we can count arithmetically, while in Fig. 7 there is a multiplicity of paths the number of which we might perhaps estimate statistically. In general the construction resembles operatively that of Fig. 4 without the geometrical regularity, and usually with an increased number of electrically parallel current paths. When the insulating material expands it is not to be anticipated that all these paths will be broken simultaneously, but if one breaks, as already described, the heating effect increases in the other paths until finally the resistance of the cluster is such as to effect the desired control action.

It is possible to construct material of the kind shown between the end plates 14 in Fig. 7, as an elongated body of uniform cross section and indefinite length and having a certain ohmic resistance for each unit of length. Thus in the case of particular applications to provide a desired resistance it will be necessary only to sever a desired length of the material and interpose it between terminals such as the end plates 14 illustrated. Given a great number of substantially identical small masses the number of conductive paths will vary substantially as the cross section of the "conglomerate," and the cross sectional area of such an elongated body may be chosen to carry a determined amount of current while the length of a segment of such a body can be related to the source voltage, in that longer units serve to provide more coincident or near coincident series breaks, which reduces the arcing voltage across each break. From one point of view the products herein described may be considered not as assemblages of mechanically connected elements but as materials of construction in themselves, just as metals or plastics are materials of construction. They may indeed be produced in different forms having different descriptive properties numerically from the electrical standpoint, but each of such forms is a functionally homogeneous material, a portion of which (whether or not severed from a larger supply) may be applied to various uses for which it is suitable.

The constructions hitherto described have functioned effectively to break the circuit under abnormal current and thus may be considered as particularly simple and compact forms of self-restoring circuit breakers. It will be clear however that the differential properties of the small masses on the one hand, and of the insulation on the other, are involved and the relative expansibilities might be reversed to provide a device which would close the circuit under certain conditions. Thus, if in Fig. 4 the short cylindrical pieces were made of zinc (preferably silver plated to avoid corrosion at the points of contact) which has a very high coefficient of expansion, and the insulator 112 of suitable material having a significantly lower coefficient of expansion (for example, a suitable "plastic" of the kinds based on an urea-formaldehyde or a melamine-formaldehyde condensation product with a suitable filler, such plastic being impregnated with carbon to provide a semi-conductor), the normal positions of the cylindrical pieces might be spaced to provide a number of air gaps between them and a normal current flowing through the semi-insulator 112 would normally not develop enough heat to expand them into contact. If, however, the heat supply were increased, they would make contact one with another and form a path of greater conductivity, perhaps diverting the current to ground. The parts also might be so proportioned as to operate in response to external heating and thus cause closing of the circuit at a given temperature, being in effect a thermostatically controlled switch. I am of course aware that it is old to provide a pair of contacts which are connected by mechanical elements to a thermally expansible member to be opened or closed in response to the change in dimensions of such member, but that I do not claim.

In general the material for the elements 10 will be chosen from the group consisting of carbon and the various metals and alloys, which latter may be cladded or plated on at least their contacting surfaces with silver or the like if they would otherwise be subject to objectionable corrosion at the contacts. A suitable material for the insulating body 12 would be sought for among those commonly utilized for the purpose of insulation, one being chosen having a suitable coefficient of expansion in view of the materials used for the small masses and the thermal conditions for which the device is designed. I have found polymerized tetrafluorethylene adaptable for many purposes. While my experiments therewith have not been extensive, polymerized trifluorochloroethylene apparently might be useful. If the devices were used in an ambient atmosphere of low temperature as in the case of refrigeration apparatus certain of the materials known by the name of Saran, being copolymers of vinylidene chloride and other monomers might be used as their expansive coefficient is large. They will not however stand such high temperatures as the tetrafluoroethylene polymer.

I am aware that the invention may be embodied in other specific forms without departing from the spirit or essential attributes thereof, and the present embodiment should therefore be considered in all respects as illustrative and not restrictive, as is in fact clear in several matters from the description itself. Reference is to be had to the appended claims to indicate those principles of the invention exemplified by the particular embodiment described and which it is desired to secure by Letters Patent.

I claim:

1. As a means for controlling the flow of current in an electric circuit a cluster of small masses most of which are normally in contact one with another and which are of relatively high conductivity to then pass a substantial flow of current, at least certain of said masses being at least in substantial frictional engagement with a mass of material of relatively high resistance which has a relatively great coefficient of expansion under heat and which is free and has sufficient rigidity so that the small masses due to said engagement receive motion therefrom when the mass expands on being heated by transmission thereto of heat developed in the cluster by the application of an abnormal current thereto, whereby the number of contact points among the small masses is reduced to reduce to a negligible value the conductivity of the cluster as a whole.

2. As a means for controlling the flow of current in an electric circuit a three dimensional cluster of small masses, most of which are normally in contact with another at certain areas and which are of relatively high conductivity to then pass a substantial flow of current therethrough, said masses being received within, and at other areas in at least substantial frictional engagement with a matrix of material of relatively high resistance and which has a relatively great coefficient of expansion under heat so that the small masses due to said engagement will be relatively moved when the matrix expands on being heated by transmission thereto of heat developed in the cluster by the application of an abnormal current thereto, whereby at least certain of formerly contacting masses are separated to reduce to a negligible value the conductivity of the cluster as a whole.

3. A means as set forth in claim 1 wherein the small masses are substantially globular.

4. A means as set forth in claim 1 wherein the small masses are elongate and presented end to end to one another.

5. A means as set forth in claim 1 wherein said material is a semi-conductor forming a path of high resistance normally short-circuited by the contacting masses and when the short circuit is broken electrically generating sufficient heat to maintain the system in that condition.

6. A means as set forth in claim 1 wherein a high resistance effective to prevent the supply of substantial current to other parts of the circuit is shunted about the cluster and is normally short-circuited thereby, but is in heat-transmitting relation to the material to maintain it in expanded condition when the short circuit path is open and current is on.

7. A means as set forth in claim 1 wherein the high resistance material provides an external insulating covering for the cluster.

8. As a means for controlling the flow of current in an electric circuit when made a part thereof, a linear cluster of small masses of conductive material which, when touching, provide several pairs of contacts serially arranged at least certain of the masses being at least in substantial frictional engagement with a body of material by which they are suspended, which body has sufficient rigidity and is free to expand and contract for relative movement of the small masses on differential thermal expansion of the masses and such body, the small masses and the material of said body having substantially different electric conductivities and markedly different coefficients of thermal expansion.

9. As a means for controlling the flow of current in an electric circuit when made a part thereof, a three-dimensional cluster formed of a multiplicity of small masses of conductive material which, when touching at certain areas, provide a number of current paths, said masses being received within, and at other areas in at least substantial frictional engagement with a matrix of material by which they are suspended for relative movement of the small masses, due to said engagement, on differential thermal expansion of the masses and such matrix, the small masses and the material of said matrix having substantially different electric conductivities and markedly different coefficients of thermal expansion.

10. A device for controlling the flow of electrical current therethrough, comprising: a carrier body having a bore portion; within said bore portion a plurality of contact bodies of diameters slightly greater than the diameter of the bore portion at areas where it touches a contact body, so that the contact bodies remain at said areas attached to said carrier body, contacting and separating upon changes of dimensions of the carrier and contact bodies; said carrier and contact bodies having appreciably different electrical conductivities and thermal expansions; and terminal means for supplying current to said bodies; whereby contact bodies touch each other or separate upon change of temperature thus controlling the current flow.

11. Device according to claim 10 wherein said contact bodies are metallic balls.

12. Device according to claim 11 wherein said balls are slightly flattened at adjacent areas.

13. Device according to claim 11 wherein said carrier body is essentially tube-shaped and slightly indented where it touches said balls.

14. Device according to claim 10 wherein said contact bodies are metallic and said carrier body is a semiconductor.

References Cited in the file of this patent

UNITED STATES PATENTS

| | | |
|---|---|---|
| 1,577,981 | Otto | Mar. 23, 1926 |
| 1,663,810 | Morse | Mar. 27, 1928 |
| 1,728,045 | Dubilier | Sept. 10, 1929 |
| 1,888,762 | Greer | Nov. 22, 1932 |
| 1,913,131 | Sission | June 6, 1933 |
| 2,119,022 | Murad | May 31, 1938 |
| 2,587,916 | Squier | Mar. 4, 1952 |